United States Patent
Chianese et al.

(10) Patent No.: US 8,393,939 B2
(45) Date of Patent: Mar. 12, 2013

(54) DUST COLLECTION FOR AN ABRASIVE TOOL

(75) Inventors: Francois Chianese, Cosnes et Romain (FR); Alexandre Lacarelle, Rodange (LU); Nicodemo Agostino, Rodange (LU)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 435 days.

(21) Appl. No.: 12/724,673

(22) Filed: Mar. 16, 2010

(65) Prior Publication Data

US 2010/0248600 A1 Sep. 30, 2010

Related U.S. Application Data

(60) Provisional application No. 61/164,996, filed on Mar. 31, 2009.

(51) Int. Cl.
*B24B 55/06* (2006.01)

(52) U.S. Cl. ............................... 451/453; 451/456

(58) Field of Classification Search .................. 451/451, 451/453, 456, 457; 144/251.1, 252.1; 83/100, 83/478, 544, 545
See application file for complete search history.

(56) References Cited

U.S. PATENT DOCUMENTS

| 4,063,478 | A | 12/1977 | Stuy |
|---|---|---|---|
| 4,224,380 | A | 9/1980 | Bovenkerk et al. |
| 4,241,505 | A * | 12/1980 | Bodycomb et al. ............ 30/390 |
| 4,253,362 | A | 3/1981 | Olson |
| 4,255,995 | A | 3/1981 | Connor |
| 5,034,041 | A * | 7/1991 | Austin ........................ 55/385.1 |
| 5,082,070 | A | 1/1992 | Obermeier et al. |
| 5,127,197 | A | 7/1992 | Brukvoort et al. |
| D342,270 | S | 12/1993 | Kwang |
| 5,385,591 | A | 1/1995 | Ramanath et al. |
| 5,505,750 | A | 4/1996 | Andrews |
| 5,518,443 | A | 5/1996 | Fisher |
| 5,865,571 | A | 2/1999 | Tankala et al. |
| 5,868,125 | A | 2/1999 | Maoujoud |
| 6,033,295 | A | 3/2000 | Fisher et al. |
| 6,039,641 | A | 3/2000 | Sung |
| 6,099,080 | A | 8/2000 | Hirashita et al. |
| 6,193,770 | B1 | 2/2001 | Sung |

(Continued)

FOREIGN PATENT DOCUMENTS

| BG | 49934 A | 3/1992 |
|---|---|---|
| EP | 0871562 B1 | 1/2003 |

(Continued)

OTHER PUBLICATIONS

Patent Cooperation Treaty, PCT Notification of Transmittal of The International Search Report and The Written Opinion of the International Searching Authority, or the Declaration for Application No. PCT/US2010/027620 dated Nov. 4, 2010, 8 pages.

(Continued)

*Primary Examiner* — Dung Van Nguyen

(74) *Attorney, Agent, or Firm* — Abel Law Group, LLP; Joseph P. Sullivan

(57) ABSTRACT

Dust collection for an abrasive tool is disclosed. In one embodiment, a first dust extraction component extracts dust from an upper part of material that is machined, while a second dust extraction component extracts dust from a lower part of the material by the abrasive tool. The first dust extraction component and the second dust extraction component collect about 100% of dust generated from the material.

19 Claims, 6 Drawing Sheets

U.S. PATENT DOCUMENTS

| | | |
|---|---|---|
| 6,286,498 B1 | 9/2001 | Sung |
| D458,948 S | 6/2002 | Chianese et al. |
| D459,375 S | 6/2002 | Chianese et al. |
| D459,376 S | 6/2002 | Chianese et al. |
| D459,740 S | 7/2002 | Chianese et al. |
| 6,427,570 B1 | 8/2002 | Miller et al. |
| 6,458,471 B2 | 10/2002 | Lovato et al. |
| 6,482,244 B2 | 11/2002 | Tselesin |
| 6,510,772 B2 | 1/2003 | Brickner, Jr. et al. |
| 6,817,936 B1 | 11/2004 | Skeem et al. |
| 6,827,072 B2 | 12/2004 | Schwammle |
| 6,872,133 B2 | 3/2005 | Lee et al. |
| 6,878,051 B2 | 4/2005 | Brach |
| 6,935,940 B2 | 8/2005 | Skeem et al. |
| 7,210,474 B2 | 5/2007 | Gaida et al. |
| 7,228,773 B2 * | 6/2007 | Powell ............................. 83/100 |
| 7,444,914 B2 | 11/2008 | Brach |
| 7,879,129 B2 | 2/2011 | Kosters et al. |
| 7,905,260 B2 * | 3/2011 | Keenan ...................... 144/252.1 |
| 7,946,907 B2 | 5/2011 | Heyen |
| 2005/0279533 A1 | 12/2005 | Corica |
| 2006/0185492 A1 | 8/2006 | Chianese |
| 2008/0060631 A1 | 3/2008 | Dofher |
| 2008/0153402 A1 | 6/2008 | Arcona et al. |
| 2009/0199692 A1 | 8/2009 | Heyen |
| 2009/0199693 A1 | 8/2009 | Heyen |
| 2010/0035530 A1 | 2/2010 | Gosamo et al. |
| 2010/0200304 A1 | 8/2010 | Gosamo et al. |
| 2010/0248600 A1 | 9/2010 | Chianese et al. |
| 2010/0279138 A1 | 11/2010 | Zheng |
| 2011/0023911 A1 | 2/2011 | Lenkeit et al. |

FOREIGN PATENT DOCUMENTS

| | | |
|---|---|---|
| GB | 790480 A | 2/1958 |
| GB | 2086822 | 5/1982 |
| GB | 2086823 | 5/1982 |
| GB | 2086824 | 5/1982 |
| JP | 51121880 | 10/1976 |
| JP | 11114945 A | 4/1999 |
| JP | 2002046018 A | 2/2002 |
| JP | 2003094432 A | 4/2003 |
| KR | 10-0263787 B1 | 5/2000 |
| KR | 100806573 B1 | 2/2008 |
| WO | 2008075777 A1 | 6/2008 |
| WO | 2009011454 A1 | 1/2009 |
| WO | 2010/016959 | 2/2010 |
| WO | 2010063036 A2 | 6/2010 |
| WO | 2010/118440 | 10/2010 |
| WO | 2011/029106 | 3/2011 |

OTHER PUBLICATIONS

Hilti, "A breakthrough in speed", Hilti DD-B Series Core Bits, 2001, Hilti Corporation, http://www.hilti.com, 7 pages.
Norton, "Silencio" Clipper, 2009, pp. 26-27.
Norton, "Silencio" Clipper, 2010, pp. 28-29.
Norton, Saint-Gobain, "Silencio" Clipper, 2011, pp. 28-29.
Norton, Saint-Gobain, "Silencio" Clipper, 2012, pp. 24-25.
Norton, Saint-Gobain Abrasives, "Technical and Sales Argumentation" 2008, 12 pages.
Norton, Saint-Gobain Abrasives S.A., "Silencio" EN13236, 2011, 2 pages.
Norton, Saint-Gobain Abrasives, "Silencio—Product Sheer", 2009, 1 page.

* cited by examiner

DUST COLLECTION FOR AN ABRASIVE TOOL

CROSS REFERENCE TO RELATED APPLICATIONS

This application claims the benefit of U.S. Provisional Application Ser. No. 61/164,996 filed on Mar. 31, 2009 and entitled "DUST COLLECTION FOR AN ABRASIVE TOOL", which is incorporated by reference herein in its entirety.

BACKGROUND

The present invention relates generally to abrasive tools and more particularly, to dust collection for a sawing machine such as a dry cutting sawing machine.

Sawing machines, such as masonry saws and tile saws, are widely used to preferably cut hard materials such as ceramic tiles, concrete pavements, building and refractory materials, composites and so forth. These types of sawing machines typically use an abrasive blade, such as a diamond blade to cut these materials. Wet cutting sawing machines are used most often, however, dry cutting sawing machines can be used when either no water supply is accessible or when the material to be cut does not tolerate exposure to water. A drawback associated with using a dry cutting sawing machine is that it tends to generate a lot of dust. Dust makes it difficult to keep the surrounding area clean. Furthermore, dust emissions can pose a serious health risk to operators of these dry cutting sawing machines, although this risk can be reduced by wearing proper dust protection gear. Not only is there a health risk to operators of these dry cutting sawing machines, there is also a risk to people that work nearby such machines.

SUMMARY

In one embodiment, there is a dust collector for an abrasive tool. In this embodiment, the dust collector comprises a first dust extraction component that extracts dust from an upper part of material machined by the abrasive tool. A second dust extraction component extracts dust from a lower part of the material machined by the abrasive tool. The first dust extraction component and the second dust extraction component collect about 100% of dust generated from the material during a machining operation by the abrasive tool.

In a second embodiment, there is a dust collector for a sawing machine that uses an abrasive blade to cut material located on a support table. In this embodiment, the dust collector comprises a pair of abrasive guards mounted about the abrasive blade, wherein each of the abrasive guards is located at opposing sides about the abrasive blade. A pair of self-adjustable side shields is mounted about the abrasive guards, wherein each of the self-adjustable side shields is located about one of the abrasive guards to close off any side openings between the abrasive guards and the support table. An upper exhaust connection port is located between the pair of self-adjustable side shields at one end thereof, wherein the upper exhaust connection port closes off any openings between a back end of the abrasive guards and self-adjustable side shields from the cutting area to the surrounding area. A dust duct located below the support table collects dust generated from the material during the cutting operation with the sawing machine and guides the dust in a direction that is in back of the cutting area of the material. A lower exhaust connection port is coupled to the dust duct. A dust cover is located at one end of the dust duct proximate the lower exhaust connection port.

In a third embodiment, there is a dust collector for a dry cutting sawing machine. In this embodiment, the dust collector comprises a pair of abrasive guards mounted about an abrasive blade of the dry cutting machine, wherein each of the abrasive guards are located at opposing sides about the abrasive blade. A pair of self-adjustable side shields is mounted about the abrasive guards, wherein each of the self-adjustable side shields is located about one of the abrasive guards to close off any side openings. An upper exhaust connection port is located between the pair of self-adjustable side shields at one end thereof, wherein the upper exhaust connection port closes off any openings between a back end of the abrasive guards and self-adjustable side shields from the cutting area to the surrounding area. A dust duct is located in a location that is below material that will be cut by the dry cutting machine, wherein the dust duct collects dust generated from the material during the cutting with the dry cutting machine and guides the dust in a direction that is in back of the cutting area of the material. A lower exhaust connection port is coupled to the dust duct. A dust cover is located at one end of the dust duct proximate the lower exhaust connection port.

In a fourth embodiment, there is a dust-free dry cutting system. In this embodiment, there is a support table and an abrasive blade that is configured to cut material positioned on the support table. A dust collector located about the support table and abrasive material collects about 100% of dust generated from the material during a cutting operation. The dust collector comprises a first dust extraction component that extracts dust from an upper part of material cut by the abrasive blade and a second dust extraction component that extracts dust from a lower part of material cut by the abrasive blade.

In a fifth embodiment, there is a dust-free dry cutting system. In this embodiment, the dust-free dry cutting system comprises a support table and an abrasive blade that is configured to cut material positioned on the support table. A pair of abrasive guards is mounted about the abrasive blade, wherein each of the abrasive guards is located at opposing sides about the abrasive blade. A pair of self-adjustable side shields is mounted about the abrasive guards, wherein each of the self-adjustable side shields is located about one of the abrasive guards to close off any side openings between the abrasive guards and the support table. An upper exhaust connection port is located between the pair of self-adjustable side shields at one end thereof, wherein the upper exhaust connection port closes off any openings between a back end of the abrasive guards and self-adjustable side shields from the cutting area to the surrounding area. A dust duct is located below the support table to collect dust generated from the material during the cutting operation with the sawing machine and guide the dust in a direction that is in back of the cutting area of the material. A lower exhaust connection port is coupled to the dust duct. A dust cover is located at one end of the dust duct.

In a sixth embodiment, there is a method for collecting dust generated by an abrasive tool. In this embodiment, the method comprises: extracting dust from an upper part of material machined by the abrasive tool; extracting dust from a lower part of the material machined by the abrasive tool; and wherein the extracting of dust from the upper part of the material and the extracting of the lower part of the material collectively collect about 100% of dust generated from the material during a machining operation by the abrasive tool.

In a seventh embodiment, there is a method for collecting dust generated from a sawing machine that is performing a cutting operation on a material, the sawing machine having an abrasive blade to perform the cutting operation and a table that supports the abrasive blade and material. In this embodiment, the method comprises: closing off any side openings between the abrasive blade and the table during the cutting operation; closing off any openings between a back end of the abrasive blade from the surrounding area; directing dust generated from an upper part of the material during the cutting operation to the back end of the abrasive blade; directing the dust from the back end of the abrasive blade to a vacuum source; collecting dust generated from a lower part of the material during the cutting operation; and directing the dust collected from the lower part of the material to the vacuum source.

In an eighth embodiment, there is a dust-free cutting method using a dry cutting sawing machine that has an abrasive blade and a table that supports the abrasive blade and material to be cut. In this embodiment, the method comprises closing off any side openings between the abrasive blade and the table while performing a cutting operation on the material; closing off any openings between a back end of the abrasive blade from the surrounding area; directing dust generated from an upper part of the material during the cutting operation to the back end of the abrasive blade; directing the dust from the back end of the abrasive blade to a vacuum source; collecting dust generated from a lower part of the material during the cutting operation; and directing the dust collected from the lower part of the material to the vacuum source.

In a ninth embodiment, there is a method of retrofitting a dry cutting sawing machine with a dust collector. In this embodiment, the method comprises placing a first dust extraction component about the dry cutting sawing machine, wherein the first dust extraction component extracts dust from an upper part of material to be cut by the dry cutting sawing machine; placing a second dust extraction component about the dry cutting sawing machine, wherein the second dust extraction component extracts dust from a lower part of material to be cut by the dry cutting sawing machine; and wherein the first dust extraction component and the second dust extraction component collect about 100% of dust generated from the material during a cutting operation performed by the dry cutting sawing machine.

DETAILED DESCRIPTION OF THE EMBODIMENTS

Figure 1:
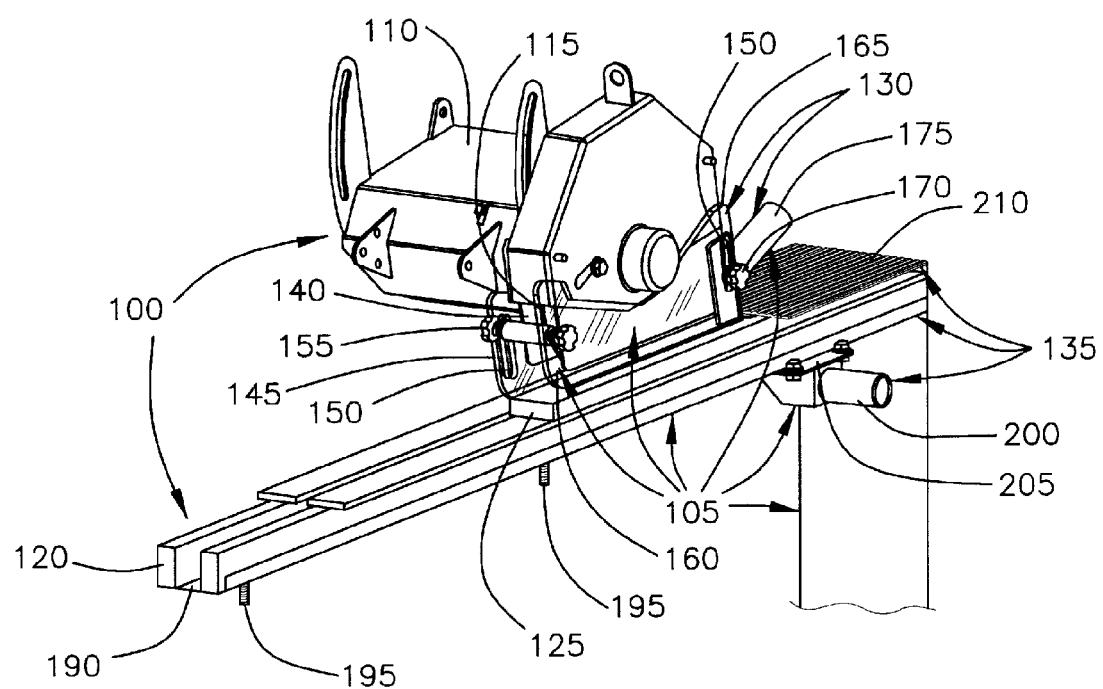
FIG. 1 is a perspective view of a dust collector for use with a dry cutting sawing machine according to one embodiment.
Figure 2:
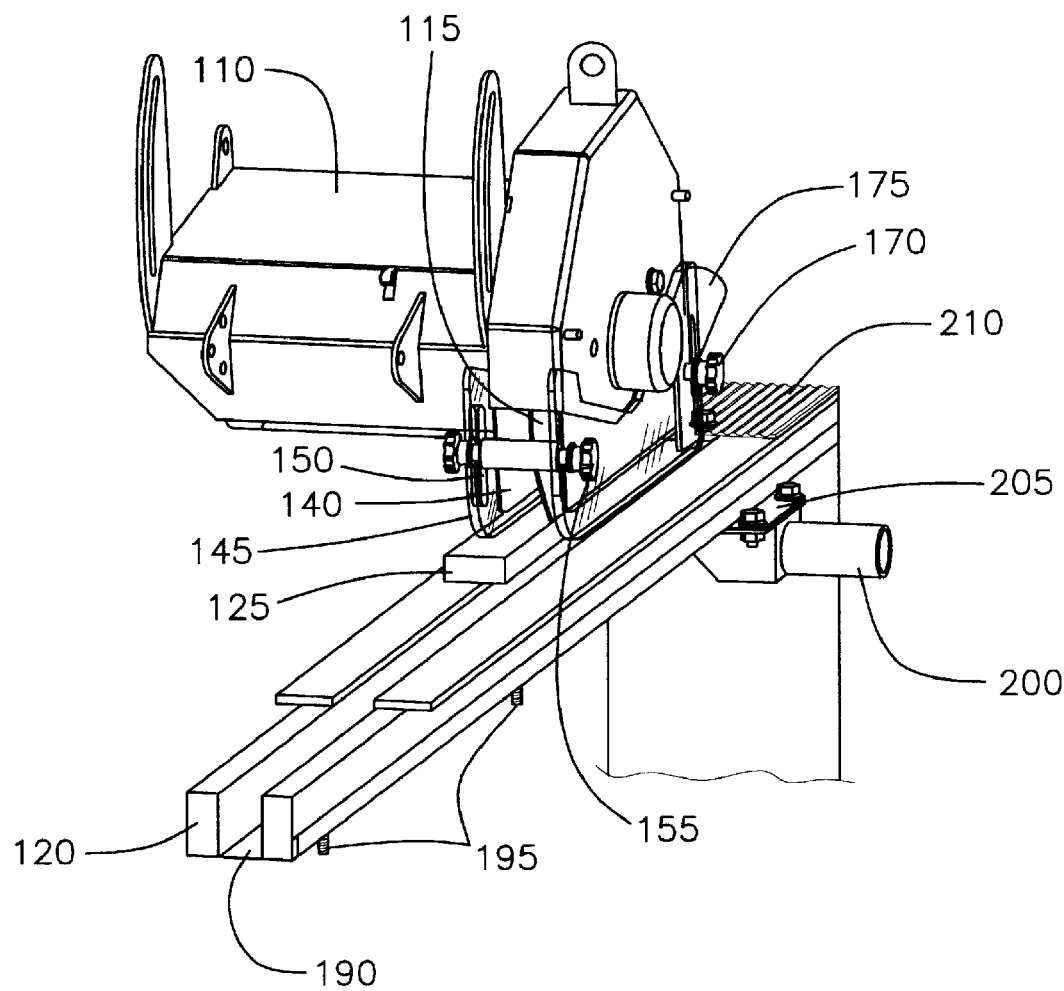
FIG. 2 is another perspective view of the dust collector and dry cutting sawing machine depicted in FIG. 1 according to one embodiment.

FIGS. 1-7 show different views of a dry cutting sawing machine 100 with a dust collector 105 according to one embodiment. Dry cutting sawing machine 100 can be used to carry out cutting operations that cut, grind or shape material by contacting it with an abrasive blade. Illustrative but non-limiting examples of material that can be cut by dry cutting sawing machine 100 include ceramic tiles, bars, stock, pipes and other materials that are made of concrete, composites, porous refractory, ceramics or masonry.

In one embodiment, the abrasive blade includes abrasive grains or grits bonded to a core made of materials such as stainless steel or other suitable metals. In one embodiment, the abrasive grains may be any conventional abrasive or superabrasive material. A non-exhaustive list of abrasives and superabrasives that may be used on the abrasive blade in this embodiment includes aluminum oxide grains (e.g., implanted with impurities), zirconium fluoride grains, zirconium sulfate grains, aluminum oxide grains and zirconium oxide grains, zirconia-alumina grains, silicon carbide grains, diamond grains, cubic boron nitride grains and combinations thereof.

Bonding can be realized through direct sintering of cold-pressed abrasives/metal bond mixes, attaching of fully densified sintered segments containing the abrasives through brazing, laser welding or arc welding, infiltration attachment, gluing or through direct attachment of the abrasive grains through brazing, vacuum brazing, electroplating or other suitable processes employed to secure the abrasive material to the core. In another embodiment, resin bonding may be used to bond the abrasive grains to the core or the entire abrasive wheel may consist of the abrasive grain/resin bond mixture. This would typically include thin wheels and cutting-off wheels such as used in industrial superabrasives applications in non-metallic materials. The industrial superabrasive cutting-off wheels typically have abrasive rims bonded thereto that consist typically of diamond abrasives evenly distributed in a polymerized resin bond. The abrasive rim in this embodiment is bonded to the metal core through the resin of the bond or special resin that provides strong bonding characteristics.

Although the description that follows is directed to a dust collector used with a dry cutting sawing machine, those skilled in the art will recognize that aspects of the dust collector are applicable to other sawing machines such as a wet-cutting sawing machine. Furthermore, the dust collector has suitable utility with other abrasive tools that generate dust from material while performing operations that can include cutting, lapping, grinding, and polishing. As used herein, dust includes any fine and dry particles as well as debris that are generated from material while performing any one of these operations (i.e., cutting, lapping, grinding, and polishing).

Referring back to FIG. 1, dry cutting sawing machine 100 is shown having a housing 110 that contains an abrasive blade 115. In addition, dry cutting sawing machine 100 includes a table 120 that supports housing 110 and abrasive blade 115 while performing a cutting operation on some material 125. In one embodiment, housing 110 and abrasive blade 115 of dry cutting sawing machine 100 may be part of any commercially available machine such as a masonry saw, tile saw and rail saw. Examples of a masonry saw, tile saw and rail saw include a CM 41 masonry saw, TR250H tile saw and a CST Modulo rail saw, respectively, all marketed by Saint-Gobain Abrasives S.A., Bascharage, Luxembourg. Table 120 may be any workstation that is suitable to support housing 110 and abrasive blade 115, while performing a cutting operation on material 125. Those skilled in the art will recognize that dry cutting sawing machine 100 may have other components (e.g., a motor electrical components, etc.), but for ease of illustrating dust collector 105 and its operation, only those components that convey the general operation of dry cutting sawing machine 100 (e.g., housing 110, abrasive blade 115 and table 120) are shown. Also, for ease of illustration, only FIG. 1 specifically shows the components (e.g., housing 110, abrasive blade 115 and table 120) that form dry cutting sawing machine 100. FIGS. 2-7 show all of the individual components that form dry cutting sawing machine 100, but the specific collective labeling of dry cutting sawing machine 100 and its components have been omitted for purposes of clarity with respect to the figures.

In one embodiment, dust collector 105 as shown in FIG. 1, comprises two dust extraction components that extract dust from dry cutting sawing machine 100. A first dust extraction component 130 extracts dust from an upper part of material 125 while being cut by abrasive blade 115. A second dust extraction component 135 extracts dust from a lower part of material 125 while being cut by abrasive blade 115. Note that for ease of illustration, only FIG. 1 specifically shows first dust extraction component 130 and second dust extraction component 135 and their respective components. FIGS. 2-7 show all of the components that form first dust extraction component 130 and second dust extraction component 135, but the labeling of dust extraction component 130 and second dust extraction component 135 from these figures have been omitted for purposes of clarity with respect to the figures.

First dust extraction component 130 comprises a pair of abrasive guards 140 mounted about a portion of abrasive blade 115. Each of abrasive guards 140 is located at opposing sides about the portion of abrasive blade 115. In one embodiment, abrasive guards 140 may be made of sheet metal, aluminum, poly(methyl methacrylate) (PMMA) etc., and are mounted to housing 110 by any one of a number of conventional fastening means. First dust extraction component 130 further comprises a pair of opposing side shields 145 mounted about abrasive guards 140 that are both self adjustable independently in height with respect to the dimensions of material 125. In one embodiment, each of the self-adjustable side shields 145 is located about one of abrasive guards 140 to close off any side openings between the abrasive guards and table 120 and material 125 during a cutting operation. As shown in the figures, each side shield 145 is mounted to an adjacent abrasive guard 140, although it is possible to mount side shields 145 to other parts. For example, side shields 145 may be mounted to an upper exhaust connection port 175 which is part of first dust extraction component 130, which is described in more detail below. In either configuration, side shields 145 can function to direct or funnel dust generated from material 125 backwards in a direction that is in back of the cutting area of the material.

In one embodiment, each of the self-adjustable side shields 145 may have an edge that is close to material 125 that is shaped to allow the side shield to climb or ascend up on the material and close the gap. This feature aids in closing off any side openings between abrasive guards 140 and table 120. In this embodiment, this edge of side shield 145 could have a large radius or one that is similar (e.g., a radius such as an elliptical shape or any other shape that looks like a radius but in reality is just another curvature) or just an angle of less than about 45° to ease the vertical self-adjusting movement of the side shields.

Side shields 145 can be made of PMMA, sheet metal etc. In one embodiment, as shown in the figures, side shields 145 are transparent to permit visibility of the cutting operation. Although transparent side shields are preferable, those skilled in the art will recognize that opaque side shields may be used if deemed desirable for particular types of cutting operations.

As shown in the figures, each of the side shields comprises an opening 150 near both ends of each shield. A first side shield fastening device 155 is located through opening 150 at a first end 160 of side shields 145. At first end 160, first side shield fastening device 155 couples the side shields 145 together at the first end. As shown in the figures, opening 150 at one of the side shields 145 at first end 160 is an oblong hole, while the opening at the opposite shield is a hole that accommodates fastening device 155. The oblong hole makes it feasible for the side shield 145 to vertically self-adjust with respect to the opposite facing side shield fastening device. In one embodiment, first side shield fastening device 155 is a bolt and nut assembly that includes a bolt with threaded ends to receive complementary thread nuts. Those skilled in the art will recognize that other fastening devices are suitable for use such as a bolt and a cross pin, or instead, the side shields 145 could be attached to a system using vertical guide pins with bushings that may be spring loaded in the vertical direction. In this case, the bushings would be connected to the side shields 145. Those skilled in the art will recognize that other shaped openings may be employed to attain vertical self-adjustability.

A second end 165 of side shields 145 comprises a second side shield fastening device 170 located at openings 150 of the side shields 145 to couple the shields together at this end. In second end 165, openings 150 on both side shields 145 include oblong holes that accommodate second side shield fastening device 170. The oblong hole makes it feasible for the side shields 145 to vertically self-adjust with respect to each other, including material 125 and abrasive guards 140. Like first side shield fastening device 155, second side shield fastening device 170 is a bolt and nut assembly that includes a bolt with threaded ends to receive complementary thread nuts. Those skilled in the art will recognize that other fastening devices and shaped opening are also suitable for use.

Figure 3:
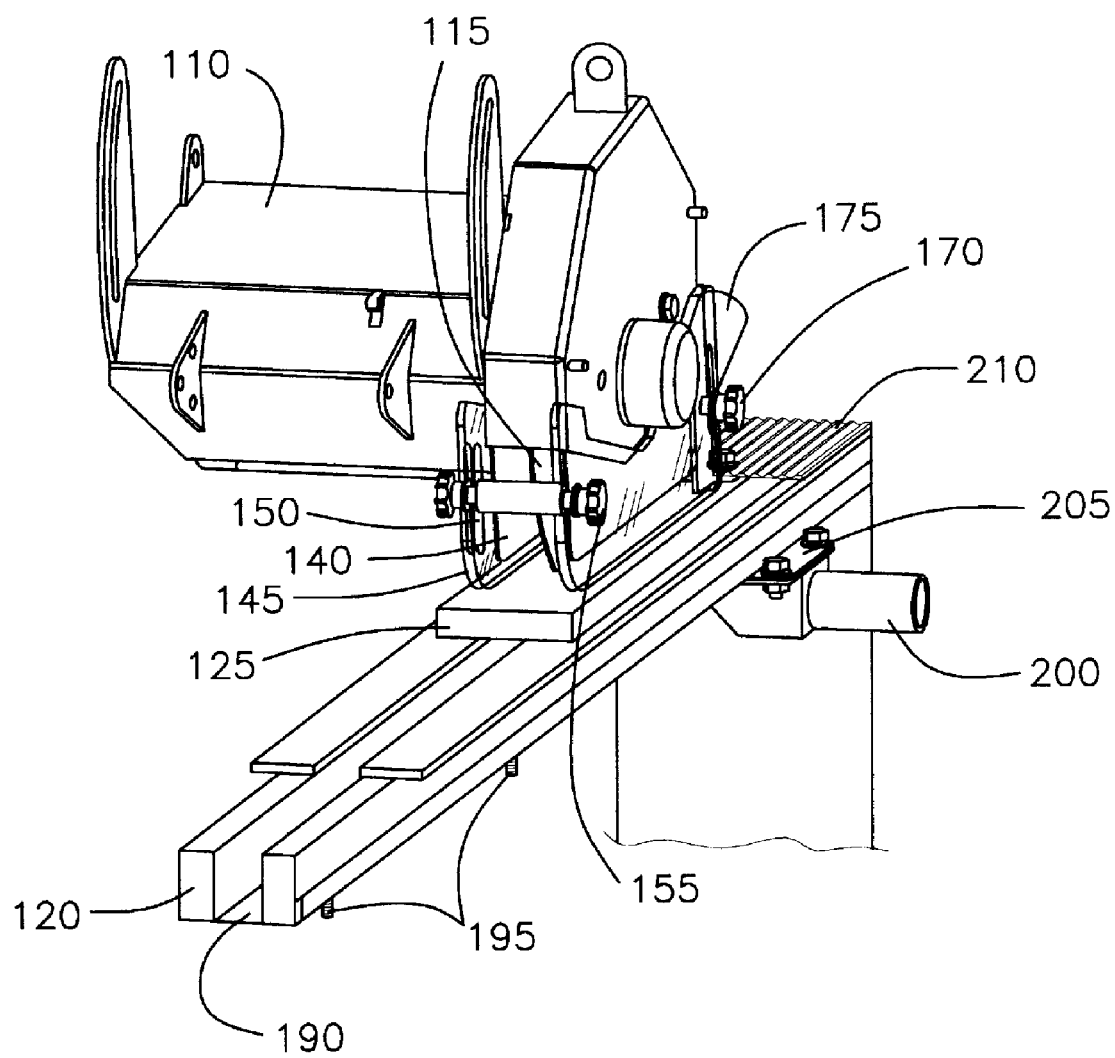
FIG. 3 is another perspective view of the dust collector and dry cutting sawing machine depicted in FIG. 1 that illustrates the adjustability of the side shields of the dust collector with respect to material undergoing a cutting operation by the dry cutting sawing machine according to one embodiment.
Figure 4:
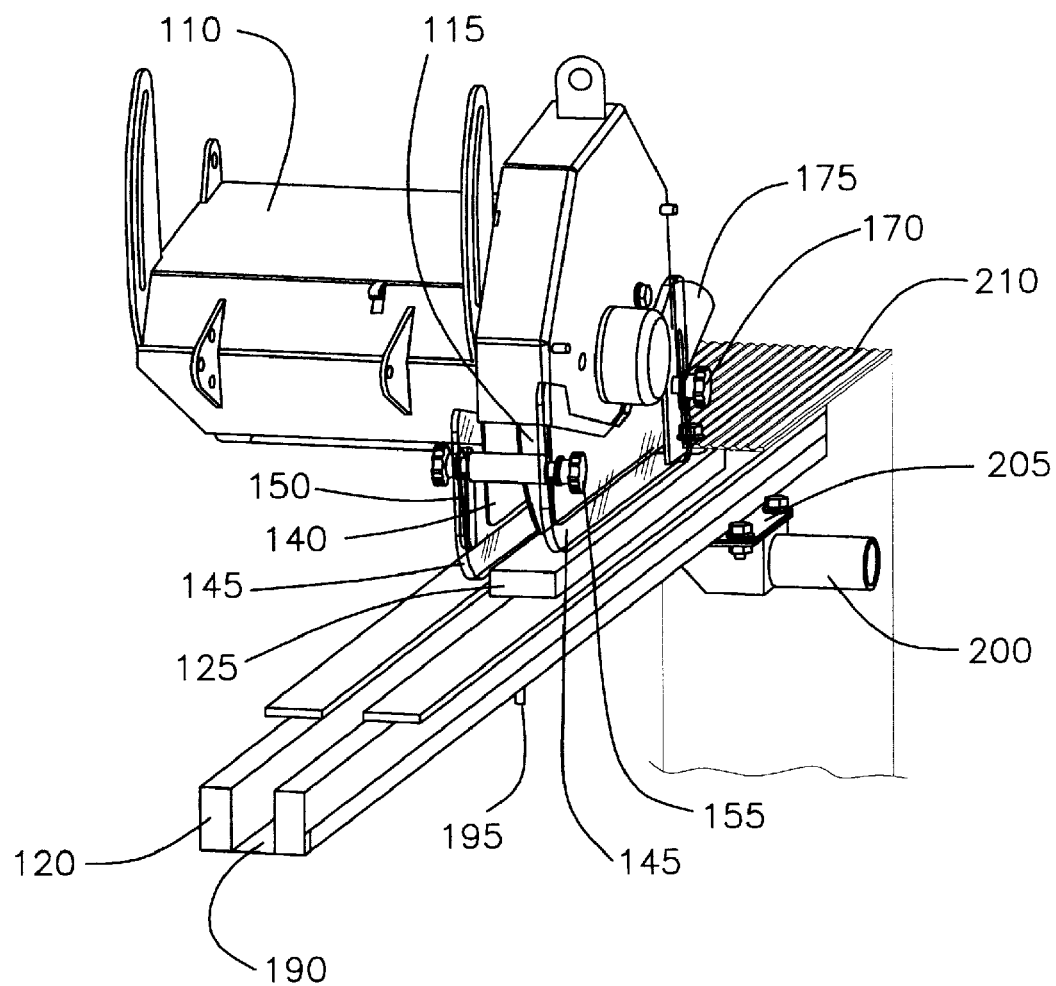
FIG. 4 is a perspective showing the side shields of the dust collector adjusted to a different position with respect to the material and dry cutting machine according to one embodiment.
Figure 5:
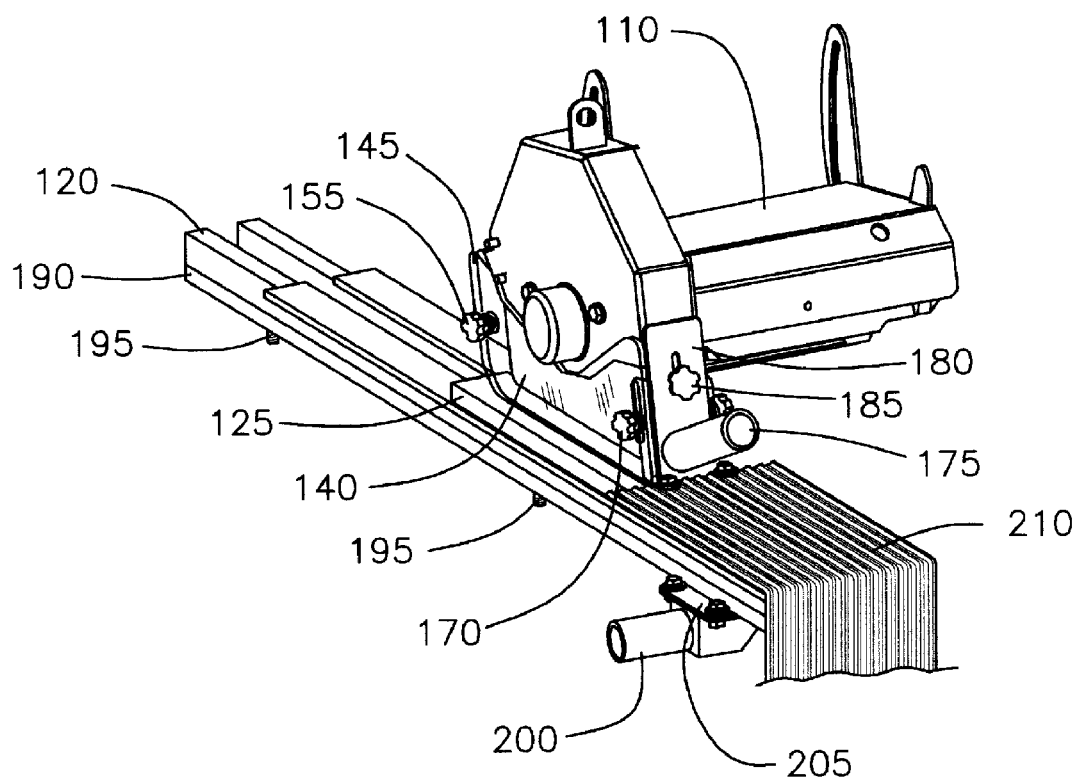
FIG. 5 shows a perspective back-end view of the dust collector and dry cutting machine depicted in FIG. 1 according to one embodiment.
Figure 6:
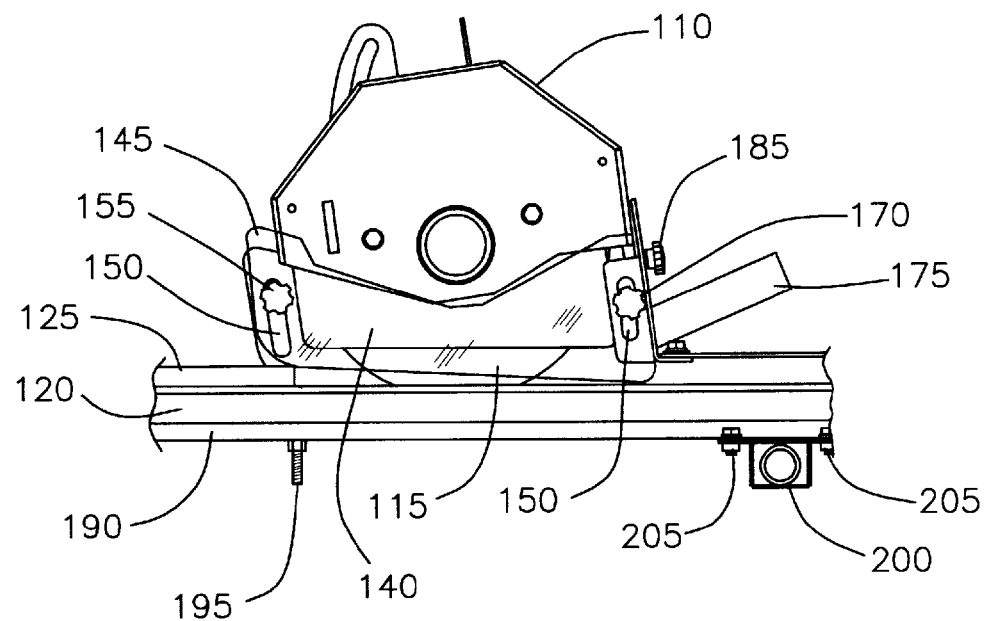
FIG. 6 shows a more detailed view of the side shields of the dust collector depicted in FIG. 1 according to one embodiment.
Figure 7:
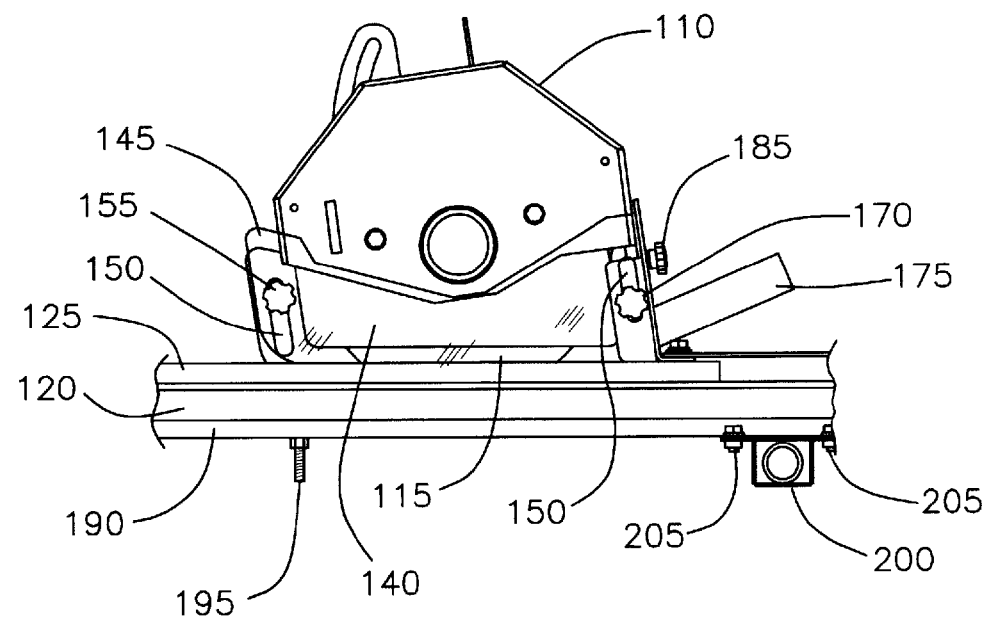
FIG. 7 shows a more detailed view of the side shields of the dust collector depicted in FIG. 1 according to one embodiment.

As shown in FIGS. 1-7, side shields 145 are self-adjustable to the dimensions of material 125 to be cut, and as a result, close any openings that would otherwise allow dust to be released from the cutting area to the surroundings. Note that in FIGS. 1, 2, 4 and 6, each of side shields 145 are self-adjusted at different heights to account for the dimensions of material 125. In particular, one side shield 145 has been self-adjusted to be placed on material 125 during the cutting operation, while the other side shield has been self-adjusted to be placed on table 120 below the height of material 125. FIGS. 3 and 7 shows both side shields 145 self-adjusted to be placed on top of the material 125 during the cutting operation.

First dust extraction component 130 further comprises an upper exhaust connection port 175 located between the pair of opposing side shields 145 at second end 165. Upper exhaust connection port 175 closes off any openings between a back end of abrasive guards 140 and side shields 145 from the machining area (i.e., the cutting area) to the surrounding area. In one embodiment, upper exhaust connection port 175 is a unitary part that can be made of one of a variety of materials that has an opening 180 (see FIG. 5) that facilitates coupling with housing 110 of dry cutting sawing machine 100. An upper exhaust connection port fastening device 185 is located through the opening (see FIGS. 5 and 6-7) to fasten upper exhaust connection port 175 to housing 110 of dry cutting sawing machine 100. Upper exhaust connection port fastening device 185 is similar to first side shield fastening device 155 and second side shield fastening device 170 in that it includes a nut and bolt assembly that comprises a bolt with threaded ends to receive complementary threaded nuts, and in that it permits vertical adjustment of the upper exhaust connection port 175 along an oblong hole. Second side shield fastening device 170 allows one to adjust the height of upper exhaust connection port 175 relative to table 120. Again, those skilled in the art will recognize that other fastening devices and other shaped openings are suitable for use with upper exhaust connection port 175.

Second dust extraction component 135 as shown in FIG. 1 comprises a dust duct 190 located below table 120 to collect dust generated from material 125 during the cutting operation with abrasive blade 115. In one embodiment, dust duct 190 may be made out of a material that includes metal or plastic. Dust duct 190 guides the dust generated from a lower part of material 125 in a direction that is in back of the machining or cutting area of the material. In one embodiment, dust duct 190 is U-shaped, however, those skilled in the art will recognize that other shaped tubes can be used. The figures shows dust duct 190 coupled to table 120 through dust duct fasteners 195. In one embodiment, dust duct fasteners 195 may comprise a nut and bolt assembly such as a bolt with a threaded end to receive a complementary threaded nut (see FIGS. 6-7). Although not shown in some of the figures, dust duct 190 and table 120 would have an opening to accommodate dust duct fastener 195.

Second dust extraction component 135 further comprises a lower exhaust connection port 200 located below the table 120. Lower exhaust connection port 200 is located below dust duct 190 and coupled thereto via an interface by a lower exhaust connection port fastener 205 which may comprise an assembly of nuts and bolts. Those skilled in the art will recognize that other fasteners beside a nut and bolt assembly can be used to fasten lower exhaust connection port 200 to dust duct 190 and table 120. In one embodiment as shown in the figures, lower exhaust connection port 200 is coupled to dust duct 190 at a location near a back portion of table 120, although it is conceivable that lower exhaust connection port 200 may be located at other locations along dust duct 190 and table 120.

Both upper exhaust connection port 175 and lower exhaust connection port 200 are configured to be connected to a vacuum source (not shown). The vacuum source generates sufficient airflow and negative air pressure within upper exhaust connection port 175 and lower exhaust connection port 200 to draw in all of the dust generated from material 125 during the cutting operation of dry cutting sawing machine 100. Although not shown, upper exhaust connection port 175 and lower exhaust connection port 200 may be provided with a sealing device to ensure that there is a substantial airtight seal or connection with the vacuum source. The vacuum source may comprise any conventional vacuum source capable of drawing a relatively high volume of air through both upper exhaust connection port 175 and lower exhaust connection port 200 so as to minimize the escape of dust-laden air. The airflow of the vacuum source may be varied, depending on the particular cutting or machining operation. Those skilled in the art will readily be able to determine the appropriate airflow level for the selected operation.

Second dust extraction component 135 further comprises a dust cover 210 located at one end of dust duct 190. In one embodiment, as shown in FIG. 1, dust cover 210 is located at the back end of dust duct 190 that receives dust generated from the lower part of material 125 during the cutting operation. In one embodiment, dust cover 210 may be fixed to abrasive guards 140 or upper exhaust connection port 175. Dust cover 210 extends over a portion of table 120 proximate to the cutting area where material 125 is located and extends downward from table 120. Dust cover 210 ensures perfect directing or funneling of dust generated from material 125 and collected by dust duct 190 for transport to the vacuum source via lower exhaust connection port 200. In one embodiment, dust cover 210 is a flexible material that may include rubber, thin sheet metal foil or a lamellar type cover with metal or plastic lamella that are interconnected to make it flexible. In another embodiment, dust cover 210 could be implemented in a spring-loaded winding device. In this embodiment, one could wind and unwind the flexible cover from the spring-loaded winding device in order to extend downward from table 120. These are only examples of possible materials and principles that may be used for dust cover 210, however, those skilled in the art will recognize that any material that has enough length, flexibility and strength to be affixed to dry cutting machine 100 and cover dust duct 190 may be suitable for use.

Those skilled in the art will appreciate that there are several ways to implement dust collector 105 with dry cutting sawing machine 100. For example, in one embodiment, dust collector 105 can be an integral part of dry cutting sawing machine 100. In another embodiment, dust collector 105 can be retro-fitted to dry cutting sawing machine 100 to be used for a variety of applications.

In operation, dust generated from the upper part of material 125 during a cutting operation is directed or funneled in back of the cutting area by abrasive guards 140 and side shields 145. Assuming that side shields 145 have been self-adjusted according to the height of material 125, no dust from the top section of material 125 will escape to the surroundings. Instead, dust that is generated from the upper part of material 125 will be directed to upper exhaust connection port 175 and transported away from dry cutting sawing machine 100 via the vacuum source. In addition, dust that is generated from the lower part of material 125 during the cutting operation is collected by dust duct 190 and directed towards the back of the cutting area. Dust that is generated from the lower part of material 125 will be predominantly directed to lower exhaust connection port 200 and transported away from dry cutting sawing machine 100 via the vacuum source. Dust cover 210 blocks the dust from escaping dust duct 190 into the surrounding by redirecting any dust back to lower exhaust connection port 200 and the vacuum source.

Using first dust extraction component 130 and second dust extraction component 135 in the manner described above herein, it has been shown that dust collector 105 collects about 100% of dust generated from material 125 during a cutting operation by dry cutting sawing machine 100. In particular, it has been found that the parts of first dust extraction component 130 and second dust extraction component 135 contribute to the overall dust removal from dry-cutting sawing machine 100 in the following manner:

Abrasive guards 140 with upper exhaust connection port 175: reduction of about 13% for alveolar particles and up to about 50% for breathable particles;

Side shields 145: reduction of about 4% for alveolar particles and up to about 15% for breathable particles; and Dust duct 190 with dust cover 210 with lower exhaust connection port 200: reduction of about 45% for alveolar particles and up to about 80% for breathable particles

EXAMPLE

The following provides particular examples describing the measurements carried out to determine the percentage of overall dust removal associated with each part of first dust extraction component 130 and second dust extraction component 135 of dust collector 105 according to embodiments described herein.

In this example, measurements were carried out by LUX-CONTROL, an independent accredited institution for measurements and certification, in accordance with the following German standards:

TRGS 900—"Technische Regeln für Gefahrstoffe"—(Technical rules for hazardous material);
TRGS 100—"Auslöseschwellen für gefährliche Stoffe"—(Minimum triggering levels for hazardous material); and
TRGS 402—"Ermittlung and Beurteilung der Konzentrationen gefährlicher Arbeitsstoffe in der Luft in Arbeitsbereichen"—(Detection and evaluation of the concentration of hazardous materials in the air of workplaces).

Tests were done in the testing area of Saint-Gobain Abrasives at Bascharage, Luxembourg in an enclosed environment (room dimensions 13 m×6 m×2.5 m). The room had been vacuumed one hour before the beginning of the tests to assure the removal of any levitating dust in the air.

The machine used was a TR 250 H marketed by Saint-Gobain Abrasives equipped with a prototype of the dust collector described herein. The tool used was a diamond blade Ø230 mm SUPER GRES XT, marketed by Saint-Gobain Abrasives.

The type of material used were tiles composed of layers of 7 mm ceramic and 7 mm of a composite wood structure. The tile length was 720 mm.

Tests were made to measure both breathable dust (aerodynamic diameter less than about 100 μm) and alveolar dust (aerodynamic diameter less than about 5 μm).

Two types of measurement were performed:
Dynamic, a pump-activated filtration device was placed directly on the operator close to his face; and
Static, a pump-activated filtration device was placed at a distance of 2.5 metres away from the machine.

The following cutting tests were made using the different aspiration configurations:
65 cuts with complete aspiration—duration ~1 h
35 cuts with aspiration only from the bottom—~20 min
35 cuts with aspiration only from the top—~20 min
34 cuts without any aspiration—~20 min Conditions had been intentionally chosen to start with the condition with the lowest dust generation and finish with the condition having highest dust generation situation.

The results were as follows:

| Aspiration | Measurement type | Alveolar dust mg/m$^3$ | Breathable dust mg/m$^3$ |
|---|---|---|---|
| Complete | dynamic | 0.00 | 1.9 |
|  | static | 0.00 | 1.0 |
| Only from the bottom | dynamic | 8.46 | 29.0 |
|  | static | 8.46 | 25.5 |
| Only from the top | dynamic | 12.69 | 68.3 |
|  | static | 10.15 | 71.4 |
| No aspiration | dynamic | 15.22 | 136.5 |
|  | static | 25.37 | 103.9 |

Acceptable limits according to German standards:
3 mg/m$^3$ for Alveolar dust
10 mg/m$^3$ for breathable dust While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A dust collector for a sawing machine that uses an abrasive blade to cut material located on a support table, the dust collector comprising:
a pair of abrasive guards mounted about the abrasive blade, wherein each of the abrasive guards are located at opposing sides about the abrasive blade;
a pair of self-adjustable side shields mounted about the abrasive guards, wherein each of the self-adjustable side shields is located about one of the abrasive guards to close off any side openings between the abrasive guards and the support table;
an upper exhaust connection port located between the pair of self-adjustable side shields at one end thereof, wherein the upper exhaust connection port closes off any openings between a back end of the abrasive guards and self-adjustable side shields from the cutting area to the surrounding area;
a dust duct located below the support table to collect dust generated from the material during the cutting operation with the sawing machine and guide the dust in a direction that is in back of the cutting area of the material;
a lower exhaust connection port coupled to the dust duct; and
a dust cover located at one end of the dust duct proximate the lower exhaust connection port.

2. The dust collector of claim 1, wherein each of the self-adjustable side shields is mounted to one of the abrasive guards.

3. The dust collector of claim 1, wherein each of the self-adjustable side shields is slidably adjustable in the vertical direction.

4. The dust collector of claim 1, wherein each of the self-adjustable side shields has a bottom edge shaped to ascend up the material and close off any side openings between the abrasive guards and the support table.

5. The dust collector of claim 1, wherein the upper exhaust connection port is vertically adjustable with respect to the support table.

6. The dust collector of claim 1, wherein the lower and upper exhaust connection ports are each configured to connect to a vacuum source.

7. The dust collector of claim 1, wherein the lower exhaust connection port is coupled to the dust duct at a location near a back portion of the support table.

8. The dust collector of claim 1, wherein the dust cover is located at the end of the dust duct that dust is guided toward, and wherein the dust cover extends downward from the support table.

9. The dust collector of claim 1, wherein the dust cover extends over a portion of the support table proximate to the material.

10. The dust collector of claim 1, wherein the dust cover comprises a flexible material.

11. The dust collector of claim 10, wherein the flexible material is configured to wind and unwind from a spring-loaded winding device.

12. The dust collector of claim 1, wherein the lower exhaust connection port is located at a location along the dust duct that is proximate the end having the dust cover located thereat.

13. The dust collector of claim 1, wherein the pair of abrasive guards, pair of self-adjustable side shields, upper exhaust connection port, dust duct, lower exhaust connection port and dust cover collectively removes about 100% of dust generated from the material during a cutting operation by the sawing machine.

14. A dust collector for a dry cutting sawing machine, comprising:
- a pair of abrasive guards mounted about an abrasive blade of the dry cutting machine, wherein each of the abrasive guards are located at opposing sides about the abrasive blade;
- a pair of self-adjustable side shields mounted about the abrasive guards, wherein each of the self-adjustable side shields is located about one of the abrasive guards to close off any side openings;
- an upper exhaust connection port located between the pair of self-adjustable side shields at one end thereof, wherein the upper exhaust connection port closes off any openings between a back end of the abrasive guards and self-adjustable side shields from the cutting area to the surrounding area;
- a dust duct located in a location that is below material that will be cut by the dry cutting machine, wherein the dust duct collects dust generated from the material during the cutting with the dry cutting machine and guides the dust in a direction that is in back of the cutting area of the material;
- a lower exhaust connection port coupled to the dust duct; and
- a dust cover located at one end of the dust duct proximate the lower exhaust connection port.

15. The dust collector of claim 14, wherein each of the self-adjustable side shields is slidably adjustable in the vertical direction.

16. The dust collector of claim 14, wherein each of the self-adjustable side shields has a bottom edge shaped to ascend up the material and close off any side openings.

17. The dust collector of claim 14, wherein the upper exhaust connection port is vertically adjustable.

18. The dust collector of claim 14, wherein the lower and upper exhaust connection ports are each configured to connect to a vacuum source.

19. The dust collector of claim 14, wherein the pair of abrasive guards, pair of self-adjustable side shields, upper exhaust connection port, dust duct, lower exhaust connection port and dust cover collectively removes about 100% of dust generated from the material during a cutting operation by the dry cutting sawing machine.

* * * * *